United States Patent [19]

Mehta et al.

[11] Patent Number: 4,711,581
[45] Date of Patent: Dec. 8, 1987

[54] ROTARY PROCESSOR FOR PLASTIC AND POLYMERIC MATERIALS PROVIDING SURGE COMPENSATION

[75] Inventors: Pradip S. Mehta, Corpus Christi, Tex.; Lefteris N. Valsamis, Stratford; Gary S. Donoian, Naugatuck, both of Conn.

[73] Assignee: Farrel Corporation, Ansonia, Conn.

[21] Appl. No.: 21,412

[22] Filed: Mar. 4, 1987

[51] Int. Cl.$^4$ .............................................. B01F 7/10
[52] U.S. Cl. ...................................... 366/99; 366/307; 366/315
[58] Field of Search ........................... 366/69, 75-77, 366/91, 96-99, 136, 137, 184, 191, 194-196, 262-265, 302-307, 315, 336, 337, 348, 349; 425/224, 203, 204, 206, 207

[56] References Cited

U.S. PATENT DOCUMENTS

| | | | |
|---|---|---|---|
| 4,142,805 | 3/1979 | Tadmor | 366/97 |
| 4,411,532 | 10/1983 | Valsamis et al. | 366/99 |
| 4,480,923 | 11/1984 | Mehta | 366/315 X |
| 4,486,099 | 12/1984 | Tadmor | 366/99 |
| 4,527,900 | 7/1985 | Mehta et al. | 366/99 |
| 4,582,433 | 4/1986 | Mehta | 366/307 X |

Primary Examiner—Timothy F. Simone
Attorney, Agent, or Firm—Parmelee, Bollinger & Bramblett

[57] ABSTRACT

A rotary processor has enclosed processing passages defined by channels in the rotor and a stationary coaxial closure. At least one processing passage is used as a stabilizing passage and another as a metering passage, whose volume and cross section are less than the stabilizing passage. A feed of plastic or polymeric material enters the stabilizing passage and may be subject to fluctuations or disturbances arising in external upstream equipment or within upstream stages of the processor itself. Substantially all material in the stabilizing passage is diverted through a first transfer passage to an entrance into the metering passage. An adjustable metering (throttling) element allows a controlled first flow of material to be carried downstream through an adjustable gap between this metering element and the bottom of the metering passage. This controlled first flow is discharged for providing material having uniform flow or at least a marked reduction in such fluctuations and disturbances. The excess material which does not pass through the adjusted gap forms a recycled second flow which is returned back through a second transfer passage into said stabilizing passage for recycling. A modified embodiment shown as metering pumping apparatus includes pairs of stabilizing and metering passages sharing, in handling throughput with adjustable throttling means for each metering passage. Interconnecting transfer passages equalize operation among these pairs. A transfer passage is also shown extending from an upstream processing passage to and past a metering passage to a stabilizing passage.

26 Claims, 22 Drawing Figures

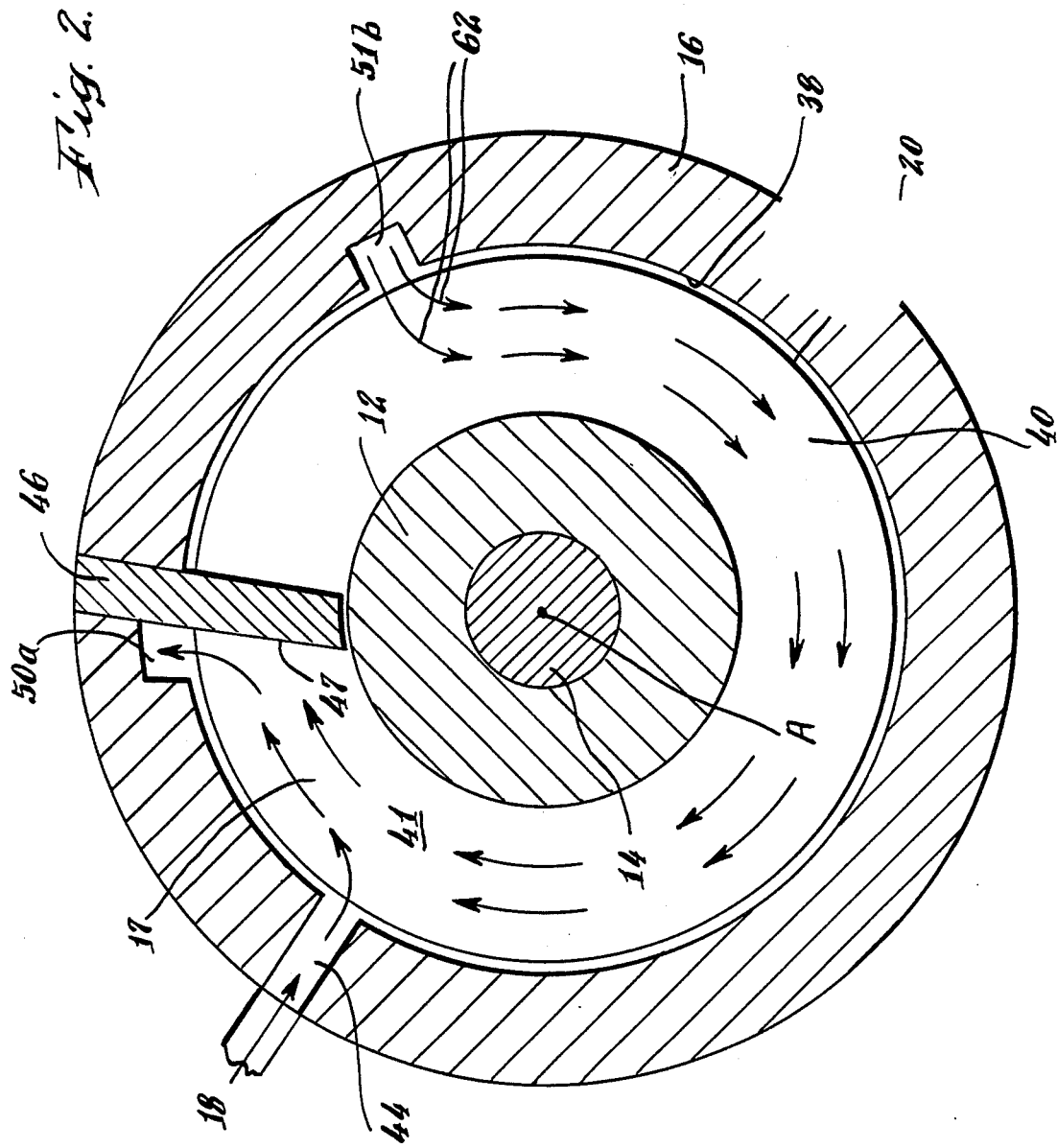

TIME IN SECONDS

TIME IN SECONDS

TIME IN SECONDS

TIME IN SECONDS

ROTARY PROCESSOR FOR PLASTIC AND POLYMERIC MATERIALS PROVIDING SURGE COMPENSATION

THE FIELD OF THE INVENTION

This invention relates to rotary processors and metering pump devices for plastic and polymeric materials for providing surge compensation for overcoming or substantially eliminating the effects of upstream fluctuations. Such fluctuations may occur in mass flow rate or pressure or may arise from melting rate variations.

BACKGROUND

Rotary processors have been used to advantage for processing plastic and polymeric materials. Details and features relating to such processors are described in U.S. Pat. Nos. 4,142,805; 4,411,532 and the references cited in the latter. Complications have arisen in applications when a rotary processor is used in a process where it is subject to upstream fluctuations in mass flow or pressure, because of disturbances or process instabilities occurring upstream of the rotary processor or in upstream stages within the rotary processor itself or due to melting rate variations. Since a rotary processor is an efficient conveyor of viscous materials, such fluctuations are translated or transmitted downstream by the flow of the material and may adversely affect process control within the rotary processor and thus undesirably affect product quality, throughput, or discharge rates.

SUMMARY OF THE DISCLOSURE

This invention is directed to rotary processors having a plurality of passages incorporating novel improved surge-controlling method, system and apparatus which afford advantages in surge compensation and in controlling the rate of mass flow or pressure in plastic and polymeric materials delivered by the processor and in removing from the materials variations or fluctuations in mass flow or pressure occurring upstream or arising due to melting rate variations.

The invention when embodied in a rotary processor advantageously provides surge compensation or suppression in plastic and polymeric materials being processed.

The rotary processors embodying this invention comprise a rotatable element carrying at least two annular channels and a stationary element providing a coaxial closure surface operationally arranged with the channels to provide enclosed processing passages. Each passage comprises an inlet, outlet and a channel blocking member associated with the stationary element and arranged and adapted so that material fed to an inlet can be carried forward by the rotatable channel walls to the blocking member for discharge from the passage. Material transfer means such as grooves formed in the coaxial surface of the stationary element transfer material from one processing passage to another.

One or more of the passages are accumulating or stabilizing passages operating in parallel and having geometries selected to optimize the efficiency of the passages. One or more other passages are metering passages operating in series with each of the stabilizing passages and in parallel with each other. The geometry of the stabilizing passages is selected to provide a larger volume and cross sectional area than the metering passages. A material transfer groove located near and communicating with the outlet of the stabilizing passage and the inlet of the metering passage transfers material from the stabilizing passage to the metering passage. Adjustable throttling means are arranged in the metering passage(s) and provide the passage with an effective capability for adjusting the flow rate through the passage to ensure a steady downstream flow in the passage. A second outlet from the metering passage is proximate to and upstream a predetermined range of distance from the adjustable throttling means and is associated with a material transfer groove leading to an inlet in the stabilizing passage located downstream of the channel blocking member of the stabilizing passage for allowing excess flow blocked by the throttling means to return to the stabilizing passage for recycle. The throttled flow in the metering passage downstream of the adjustable throttling means is then conveyed by the rotating walls to the channel blocking member and its associated outlet for discharge.

Regardless of whether the upstream fluctuations in mass flow or pressure are occurring upstream of a rotary processor or within preceding stages of the rotary processor itself, employing the present invention in the rotary processor will advantageously eliminate (or at least markedly reduce) downstream fluctuations and will thereby provide uniform or substantially uniform discharge rates and predictable, controlled output conditions in the processed material. Surges in flow and pressure are suppressed or compensated.

BRIEF DESCRIPTION OF THE DRAWINGS

The invention will be described in connection with the accompanying drawings in which like elements will bear the same reference numbers throughout the various views. The drawings are arranged for clarity of illustration, and thus the various components may not be drawn to scale.

FIG. 2 is a simplified and enlarged cross-sectional view of the stabilizing channel taken along lines 2—2 of FIGS. 1, 5 and 7.

In FIG. 4A for clarity of illustration the stabilizing channel and the metering channel are shown laid out as straight parallel channels. In FIGS. 4B and 4C portions of the rotor and of the stationary element are shown in section, with a transfer groove provided in the coaxial closure surface of the stationary element.

In FIG. 6 an upstream channel is shown laid out straight in parallel with the stabilizing and metering channels, and a transfer groove from the upstream channel extends across above the metering channel (in the center) and over to the stabilizing channel which is on the opposite side of the metering channel from the upstream channel.

DETAILED DESCRIPTION OF THE PREFERRED EMBODIMENTS

Figure 1:
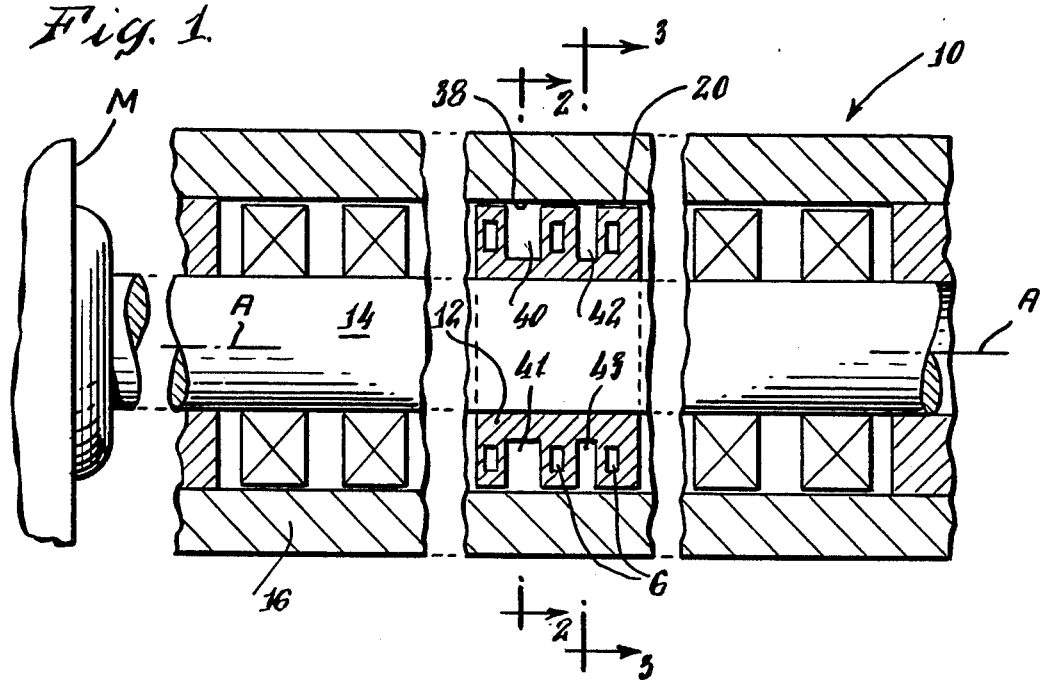
FIG. 1 is an axial sectional view of a portion of a rotary processor embodying this invention showing a stabilizing channel and a metering channel.

Inasmuch as the novel rotary processor embodying the present invention is capable of performing as a free-standing device or the invention may be embodied as stages in a rotary processor having other stages therein as known in the art, for illustrative purposes the rotary processor shown in FIG. 1 omits the optional earlier stages for melting and mixing or compounding polymeric materials fed to the elements embodying the present invention. Referring to FIG. 1, novel multi-passage rotary processors 10 embodying the prsent invention include a rotatable element comprising a rotor 12 mounted on a drive shaft 14 for rotation around a longitudinally extending concentric axis A within a stationary element comprising a housing 16. Rotor 12 carries a plurality of channels 40 and 42 each having spaced opposed side walls extending inwardly from rotor peripheral surface 20. Driving means for rotating this rotor 12 are shown partially at M, since such driving means are of any suitable type commonly used for driving rotary processors or similar polymeric processing apparatus and are well known to those in the art.

Housing 16 of the stationary element provides a coaxial closure surface 38 cooperatively arranged with peripheral surface 20 of the rotor 12 to form with channels 40 and 42 enclosed passages 41 and 43 respectively. Passage 41 is hereinafter referred to as the stabilizing passage. Passage 43 is hereinafter referred to as the metering passage. The geometries of the stabilizing channel 40 and the metering channel 42 are selected such that the volume and cross-section area of the stabilizing passage 41 are larger than the volume and cross-section area of the metering passage 43. The geometry of the metering channel 42 is selected such that the channel walls are substantially parallel to one another and in this embodiment they present a rectangular configured cross-section for this metering channel 42. Each channel wall of the substantially rectangular metering channel may diverge up to a maximum of about 5° from exact parallelism and be considered substantially parallel for purposes of the present invention.

Figure 4B:
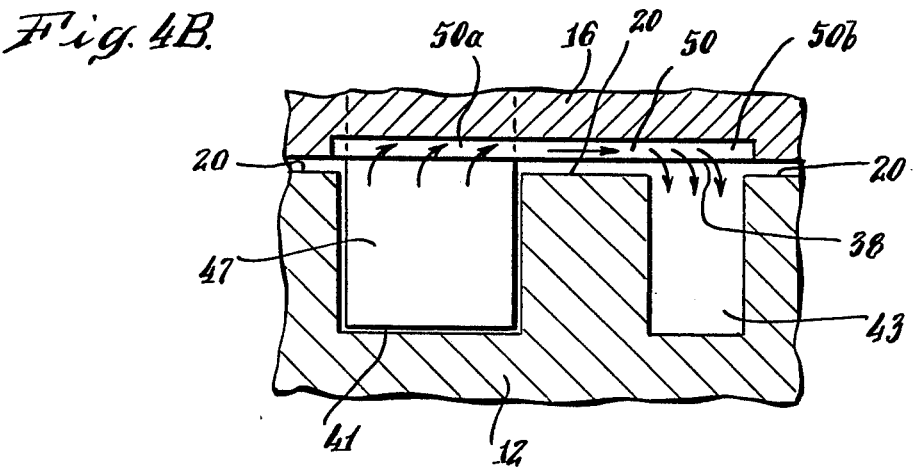
FIGS. 4A, 4B and 4C are simplified enlarged schematic views of the interconnections of a stabilizing channel and a metering channel of a rotary processor embodying the invention, such interconnections being by means of transfer grooves with arrows indicating the flow directions of material.
Figure 4C:
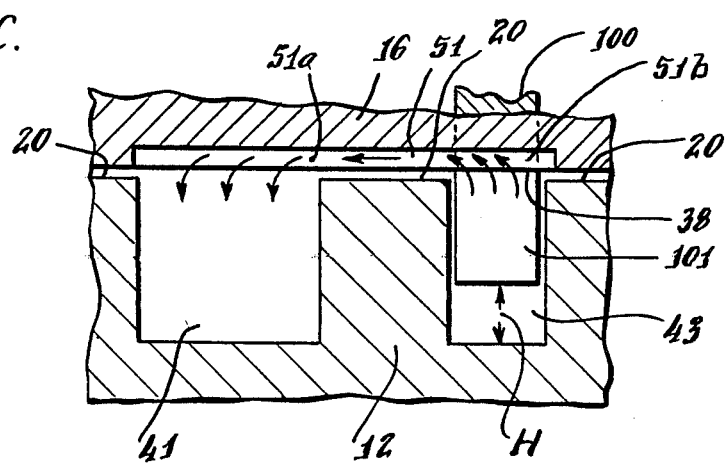

Stabilizing passage 41 and metering passage 43 are interconnected by material transfer grooves (described later) formed in closure surface 38 and arranged so that material can be transferred over the rotor surface 20 from one passage to another as explained in detail hereafter, and as is shown in FIGS. 4B and 4C.

Referring now to FIG. 2, the stabilizing passage 41 is provided with: an inlet port 44 which supplies flowable plastic or polymeric material 18 from an upstream source such as a preceding stage of the rotary processor or from an external source; a channel blocking member 46 which diverts material from the channel 40 to exit from the passage 41 by means of an exit 50a leading to a material transfer groove 50 (FIGS. 4A and 4B); and a second inlet port 51b located downstream of and proximate to the blocking member 46. The flowable material 18 entering into this stabilizing passage 41 through the inlet port 44 may be in fluid condition from its constituents or may be molten.

Figure 3:
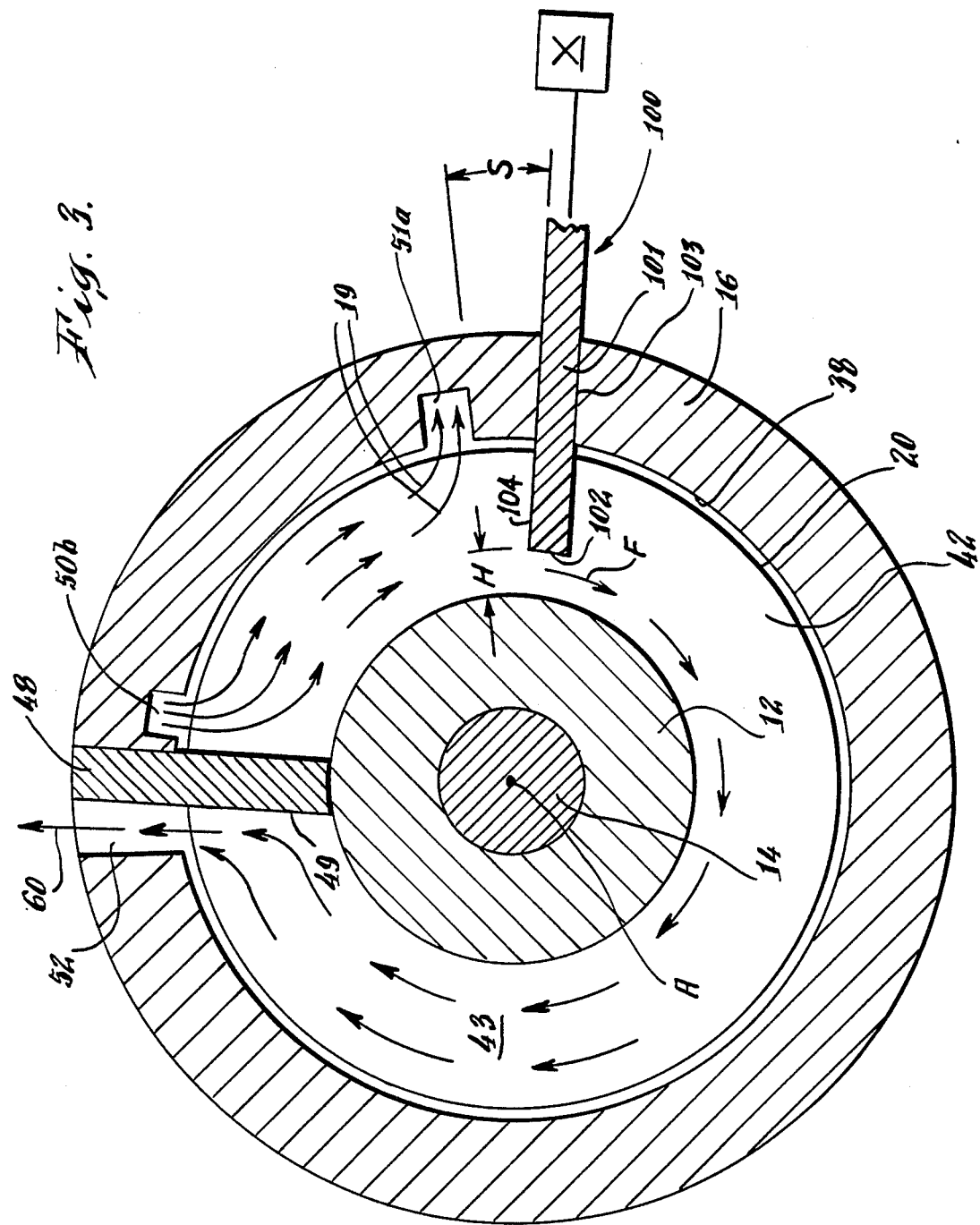
FIG. 3 is a simplified and enlarged cross-sectional view of the metering channel taken along lines 3—3 of FIGS. 1, 5 and 7.

Referring now to FIG. 3, the metering passage 43 is provided with: an inlet port 50b which is the terminal end of the transfer groove 50 (FIG. 4A) which transfers material from the stabilizing passage 41; a first exit port 51a which is the entrance to a transfer groove 51 (FIGS. 4A and 4C) which carries material over the surface 20 of the rotor to the second inlet port 51b (FIG. 2) of the stabilizing passage 41; a novel throttling or metering means 100 (FIG. 3) located downstream of and proximate to the first exit port 51a; a second exit port 52 and a channel blocking means 48 located downstream of and proximate to said second exit port 52.

The novel throttling means 100 includes an adjustable member 101 arranged and adapted to extend radially inwardly through an opening 103 in the housing 16 into the metering channel 42 to block a selected portion of this channel. This adjustable member 101 provides the capability to selectively regulate the rate of flow in the metering passage 43 downstream of this adjustable member. The inward and outward radial position of the adjustable member 101 is adjusted by suitable operating means X which may comprise a manually operated feedscrew, a rack and pinion gear mechanism, or a servo mechanism actuated by feedback signals indicative of the flow rate of the material issuing from the discharge port 52 or by any other suitable control means.

As is shown in FIG. 3, flow from the inlet port 50b into the metering passage 43 in excess of that which can pass through a gap H between the root of the metering channel 42 and the bottom face 102 of the adjustable member 101 is diverted by the upstream face 104 of this adjustable member through the first exit port 51a leading into the transfer groove 51 (FIGS. 4A and 4C) which carries the excess material flow back into the accumulating passage 41 (FIG. 2) where it enters through the second inlet port 51b at the end of the transfer groove 51. The upstream face 104 is spaced downstream from the downstream side of the exit port 51a by an angular spacing "S" around the rotor axis A in the range from about 5° to about 20° for generating a pressure of about 10 PSI to about 50 PSI in the material upstream of the front face 104 in order (1) to drive material through the gap H and in order (2) to avoid an unduly large proportion of material exiting through the exit port 51a.

The controlled metered flow F (FIG. 3) downstream of the adjustable member 101 in the metering passage 43 which has passed through the gap H between the root of the metering channel 42 and the bottom face 102 of this adjustable member is carried by the rotating walls towards the channel blocking member 48. The upstream face 49 of the blocking member 48 diverts the metered flow to the second exit port 52 also called the discharge port where it exits with a flow rate and pressure which are much more nearly constant, i.e., more uniform and predictably controlled, than conditions found in the entering material 18 (FIG. 2) at the inlet 44.

In operation, material 18 is supplied gravitationally or through the use of force to the processor 10 through the inlet 44 into the stabilizing channel 40 as shown in FIG. 2. FIG. 2 illustrates the stabilizing passage 41 formed by the channel 40 and the coaxial surface 38. The stabilizing passage 41 includes the channel blocking member 46 arranged near, and downstream of, the exit 50a into the material transfer groove 50 (FIGS. 4A and 4B) which is arranged to communicate with the metering passage 43 as previously explained.

As shown (FIG. 2) the blocking member 46 provides a material blocking and collecting face 47 for the channel 40. Accordingly in operation, movement of the main body of entering material 18 fed into the stabilizing passage 41 is blocked and relative movement is established between the moving channel walls and the blocked material. This relative movement generates frictional heat at the moving walls and within the body of material in the region 17 in front of the blocking and collecting face 47. Additionally, the walls are normally temperature controlled by a heat transfer fluid supplied in known manner to chambers 6 (FIG. 1). Details relating to suitable heating means are found in U.S. Pat. Nos. 4,142,805 and 4,194,841.

Normally the action of the channel walls in dragging material forward builds up pressure progressively about the passage and maximum pressure is usually reached near or adjacent to surface 47 of blocking member 46. Surface 47 is shaped and dimensioned to be adapted to block and collect the material for discharge from the stabilizing passage 41.

Figure 4A:
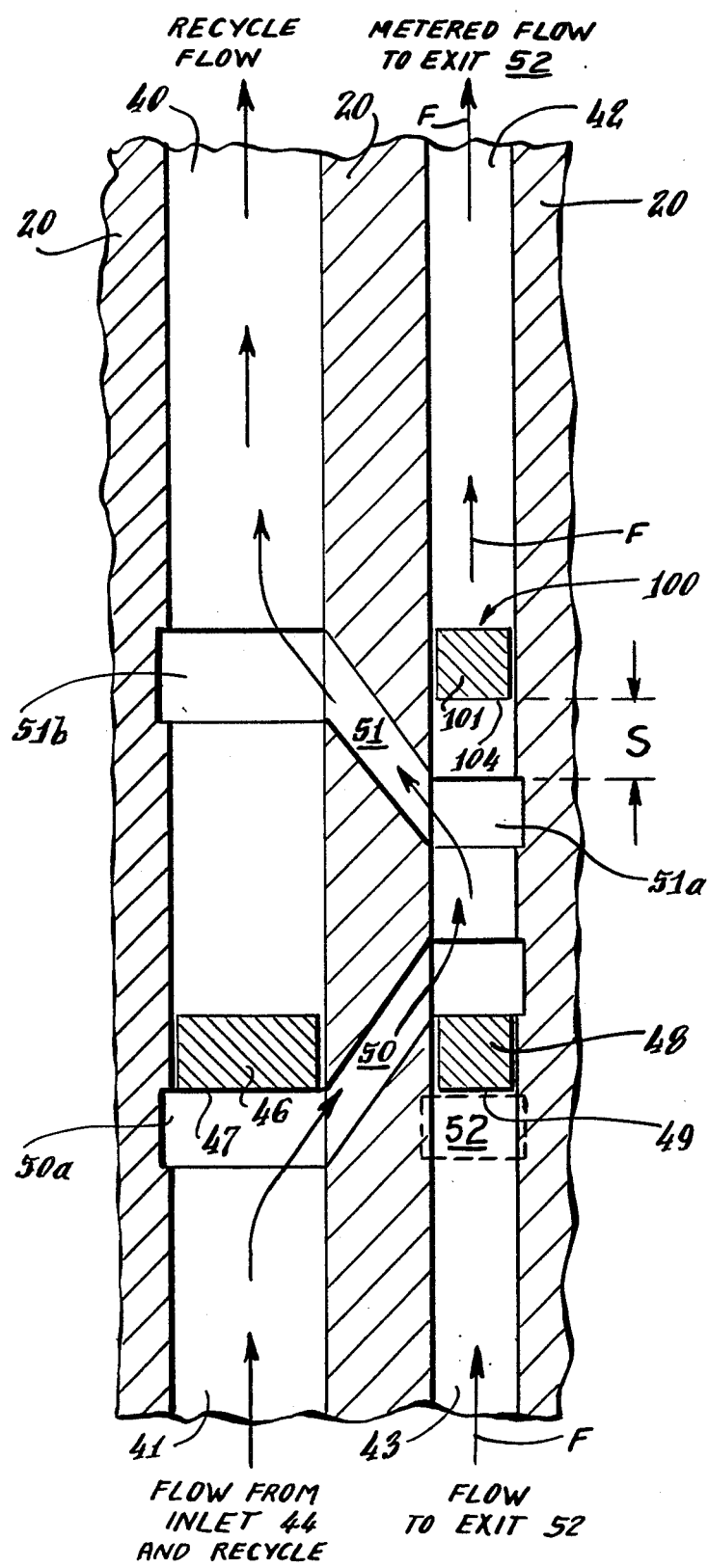

Material is discharged from this stabilizing passage through the exit 50a leading into the material transfer groove 50 (FIG. 4B) which is formed in the coaxial surface 38 adjacent to and upstream of the face 47 of the blocking member 46. As shown in FIG. 4A, the transfer groove 50 extends at an angle to a line parallel with the axis of the rotor 12 being inclined forwardly in the same direction as the direction of flow in the stabilizing passage 41 with the open end 50a of the groove 50 disposed to receive processed material collected at the surface 47 and to convey the received material over the surface 20 of the rotor 12 for discharge into the channel 42 of the metering passage 43. As shown in FIGS. 3 and 4A the terminal portion 50b of the groove 50 provides an inlet as previously described for the metering passage 43.

The metering stage included at least one passage shown in FIG. 1 as passage 43. For reasons of cooperating with the adjustable throttling member 101 as explained more fully below, it is preferred that the walls of the metering channel 42 be substantially parallel so that the cross-section of the metering passage 43 is substantially rectangular. Up to a maximum divergence of about 5° for each wall from exact parallelism may be provided to give sidewall clearance for inward and outward adjustment of the adjustable metering member 101. In addition, the cross-section area and volume of the metering passage 43 are chosen so that they are smaller than those of the stabilizing passage 41.

As discussed in the introduction variations, fluctuations or disparities in the rate of mass flow or pressure of materials supplied to a rotary processor (or in the case of a multi-stage processor, upsets upstream) or fluctuations due to melting rate variations often lead to variations in the rate of flow or pressure with sometimes severe surges and fluctuations in flow, pressure, and temperature throughout the system, and particularly at the discharge of the processor. Additional details of such problems are found in U.S. Pat. Nos. 4,389,119 and 4,402,616.

The present invention provides novel, improved rotary processors which include means for improving the control of the rate of discharge flow or pressure in processors subject to variations, fluctuations or disparities in the rate of mass flow or pressure in the entering material 18. In accordance with certain aspects of the present invention the novel adjustable throttling or control means 100 (FIG. 3) is arranged near the entrance region of the metering passage 43. As explained previously, this throttling or metering control 100 includes the adjustable member 101 arranged and adapted to extend an adjustable distance down radially into the metering channel 42 for blocking a portion of this channel, thereby leaving a controlled gap of height H (FIG. 3) between the inner end face 102 of this movable throttle member 101 and the root of the metering channel 42. The adjustable member 101 provides the capability for selectively adjusting the throughput F of the metering passage 43. The rate of the mass flow downstream of the adjustable member 101 in the metering passage 43 and thus the rate of discharge at the exit port 52 are directly related to the adjustment setting of the adjustable memer 101. Upstream and proximate to the adjustable member 101 is the open exit 51a into the material recycling transfer groove 51 which transfers material diverted into it by the face 104 of adjustable member 101 back into the stabilizing passage 41 (FIG. 2) where it enters the stabilizing channel 40 at the outlet end 51b of the transfer groove 51 to be recycled. This outlet end 51b lies over the stabilizing channel 40 downstream of the channel blocking member 46 and forms the second inlet port 51b previously descirbed for this stabilizing passage 41.

As seen in FIG. 3, the exit 51a and the associated throttling element 101 are positioned with respect to the metering passage 43 less than forty percent of the total distance downstream along said metering passage from the entrance 50b to the second exit 52.

As seen in FIG. 4A, the recycling transfer groove 51 extends at an angle to a line parallel with the axis of the rotor 12, being inclined forwardly in the same direction as the direction of flow in the metering passage 43.

The geometry of the adjustable throttling member or throttling pin 101 is selected such that its upstream face 104 is substantially rectangular and when this member 101 is fully extended into channel 42 it substantially blocks metering passage 43. During operation the adjustability of the member 101 provides control of the size of the opening H bounded by the root of the metering channel 42 and the bottom face 102 of the member 101.

As shown in FIG. 3 the member 101 is adjusted to provide clearance H which decreases the quantity of material flow F in the passage 43 to an extent that an excess flow of material builds up at its upstream face 104. This excess pool (FIG. 3) of material is pressed up the upstream face 104 to recycling transfer groove 51 which conveys it back to the stabilizing passage 41 for recycle. The material flow is schematically shown by arrows in FIG. 4. This recycling produced by the throttling means 100 leads to a measured or metered rate of flow F (FIG. 3) of material downstream of the adjustable member 101 and beyond to the exit port 52. It is important that the gap H be so adjusted that the net metered flow F equals the "averaged" flow over several minutes (at least three minutes) incoming into the inlet 44 (FIG. 2) of the stabilizing passage 41 for avoiding continued accumulation of material in this stabilizing passage.

Advantageously, the material in the metering passage 43 (FIG. 3) is separated by the throttling means 100 into two flows. There is a first controlled metered flow F which passes through the adjusted gap of clearance height H and is carried downstream by the metering passage 43 to the discharge outlet 52 for providing an output flow 60 of uniform or practically uniform character. There is an excess uncontrolled second flow 19 forming the recycled flow which is diverted out through exit 51a and thence through the second transfer passage 51 back into the stabilizing passage 41 for recycling. Consequently, in large measure fluctuations and disturbances in mass flow and pressure are separated and isolated from (de-coupled from) the controlled metered flow F and are carried back through the second transfer passage 51 into the stabilizing passage 41. By virtue of the fact that the processing passage 43 is narrower than the stabilizing passage 41 and due to the spacing S, the pressure in the material 19 in front of the front face 104 forming the recycled second flow is considerably higher than the pressure in the stabilizing passage 41 (FIG. 2) in the region 62 near the inlet port 51b downstream from the blocking member 46. Consequently, in an advantageous manner when this recycled flow 19 (FIG. 3) which is carrying the major proportion of fluctuations and disturbances enters into the low pressure region 62 (FIG. 2) in the stabilizing passage 41, the fluctuations tend to dissipate themselves in the region 62. In other words, a significant proportion of the fluctuations in mass flow and pressure damp themselves out in the low pressure region 62 rather than being transmitted downstream through the material in the stabilizing passage 41. It will be understood that the pressure in the region 17 (FIG. 2) in front of the blocking face 47 is significantly greater than the pressure in the region 62.

Figure 5:
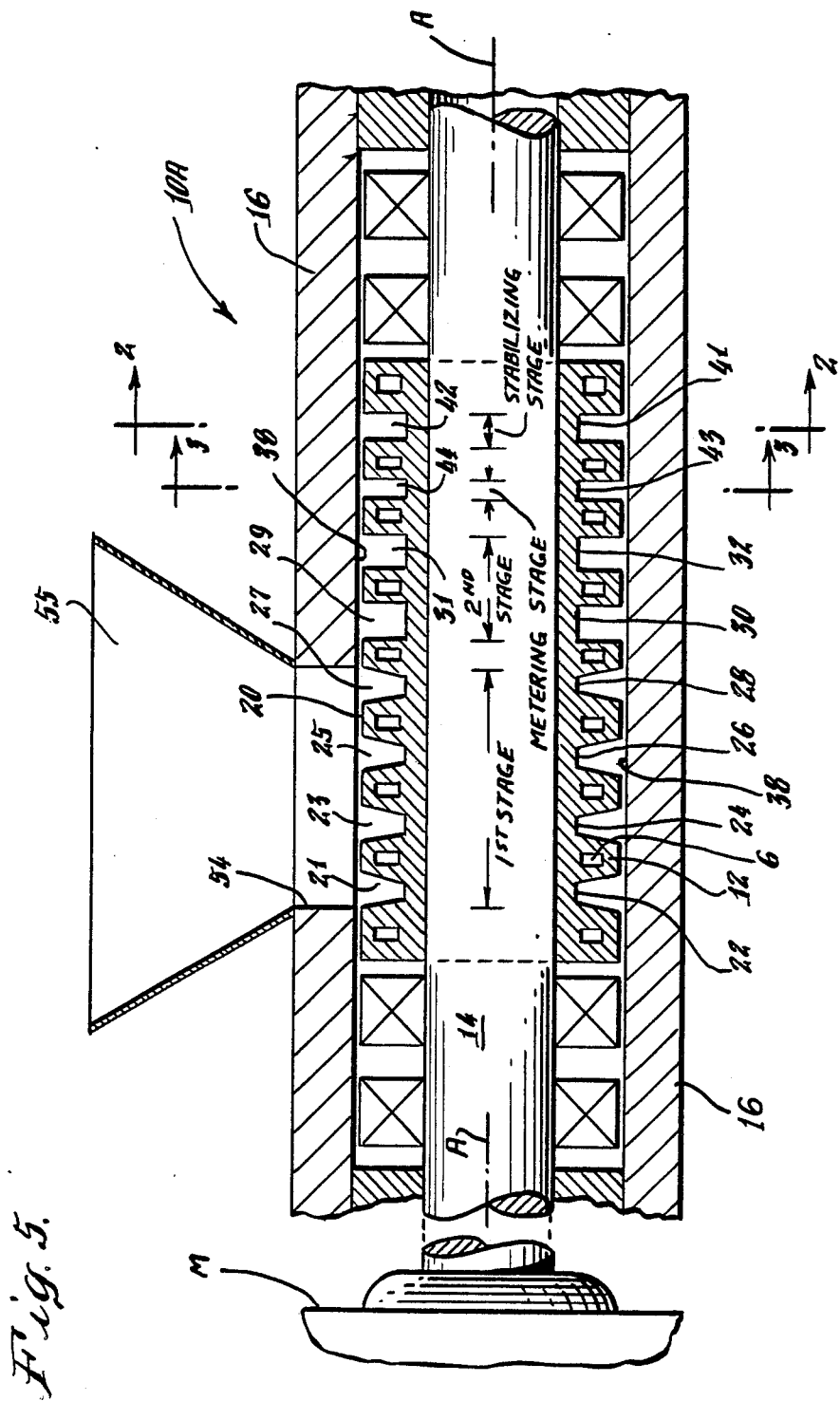
FIG. 5 is an axial sectional view of a rotary processor incorporating another embodiment of this invention.
Figure 6:
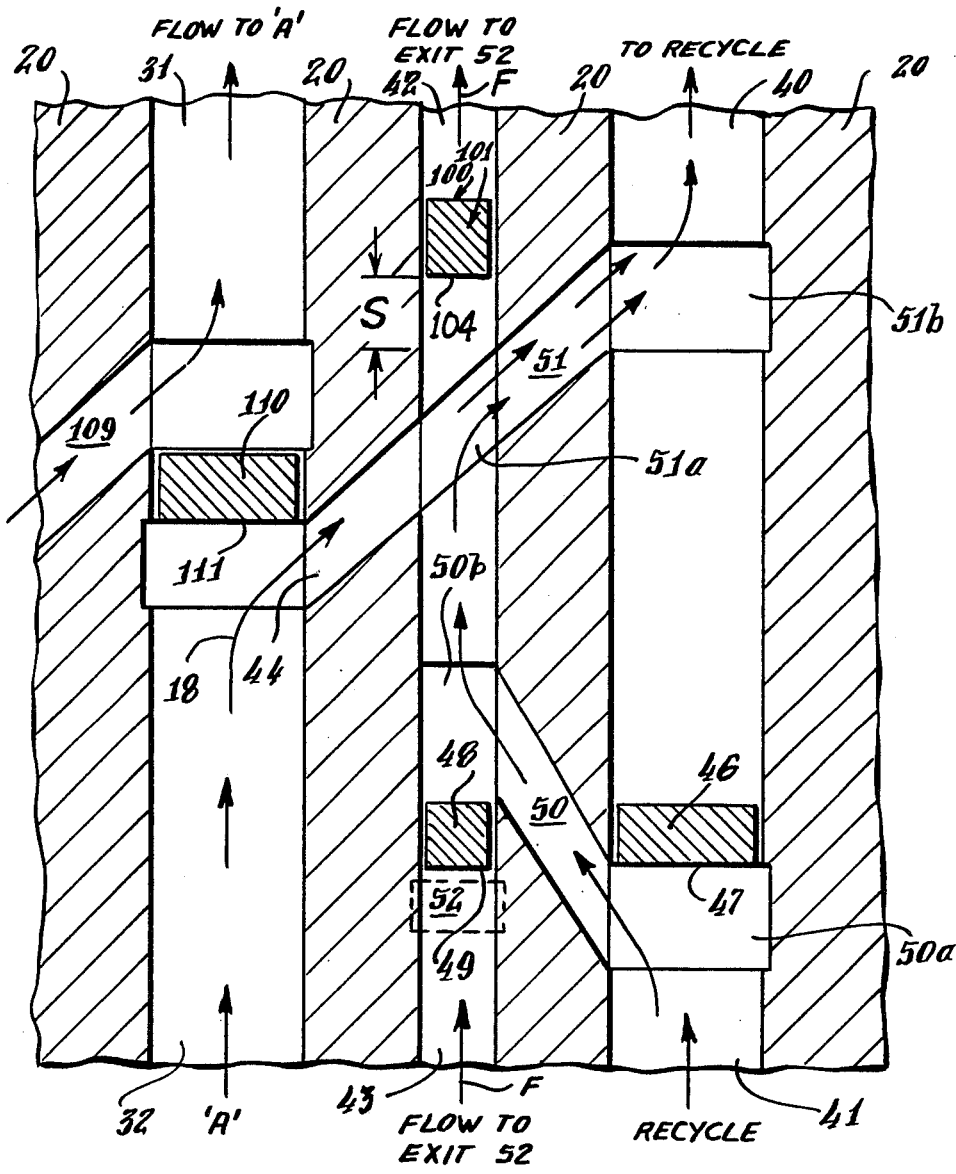
FIG. 6 is an enlarged simplified schematic view of the interconnections of the stabilizing channel and the metering channel of a rotary processor embodying the invention, the interconnections being by means of transfer grooves with arrows indicating the flow direction of material.

FIGS. 5 and 6 illustrate an embodiment of the present invention in a rotary processor such as that described in U.S. Pat. No. 4,411,532, which is incorporated into this specification by reference. In this embodiment the "outboard section" of that rotary processor is utilized as the stabilizing passage, and the "third stage" of that rotary processor is modified according to this invention for use as the metering passage, as will be understood from the following description.

In this novel multi-passage rotary processor 10A in FIG. 5 materials to be processed are fed into the processor by means of a hopper 55 and enter through a port 54 in the housing 16 leading into first state passages 22, 24, 26, and 28 provided by channels 21, 23, 25 and 27 in the rotor 12. In these passages 22, 24, 26 and 28 the materials are melted and at least partially processed.

In operation, the materials in these first stage passages 22, 24, 26 and 28 are moved from one passage into the next succeeding downstream passage, thereby progressing toward the second stage by means of passage blocking means, similar to these described earlier, which urge material into transfer groove(s) (not shown) formed in the enclosing surface 38. The material is similarly transferred to the second stage passages 30 and 32 provided by channels 29 and 31 respectively, by means of a transfer groove (not shown) connecting passages 28 and 30. Material in passage 30 is in turn transferred into passage 32 by a transfer groove 109 (FIG. 6). Passages 30 and 32 substantially complete the processing of material in the rotary processor. Any upsets in feed rate and those which may occur during the processing are transmitted down stream by the highly viscous plastic or polymeric material. This transmission of fluctuations or variations from upstream may therefore lead to rather substantial variations in the rate of mass flow or pressure in passage 32. The advantageous incorporation of the present invention into the remaining stages of the processor 10A affords means to control and stabilize the rate of mass flow and pressure of the material exiting from the processor.

Referring to FIG. 6, material is conveyed by the transfer groove 109 into the processing passage 32 where it enters just downstream from the blocking member 110. The rotating walls urge the material along the channel 31, the friction of the walls and shearing circulation of the mterial imparting heat to the material, and the differing rates of the motion causing vigorous mixing. As the material approaches the upstream face 111 of the channel blocking member 110, it is forced into a long transfer groove 51 which conveys it across the rotor surface 20, past the metering passage 43 and across another rotor surface 20 to its exit 51b serving as an inlet port into the stabilizing passage 41 (see FIG. 2 also). The moving walls of the channel 40 carry the material toward the channel blocking member 46. The face 47 of this blocking member 46 forces the material into an exit 50a leading into a transfer groove 50 which conveys material across the rotor surface 20 to its exit 50b just downstream of the blocking member 48 in the metering passage 43 (see FIG. 3 also). The material is carried by the moving walls of the channel 42 toward an adjustable member 101 of throttling means 100. As the material approaches the adjustable member 101 its face 104 forces the material unable to pass under the bottom face 102 of the adjustable member 101 up into the entrance 51a of the long transfer groove 51 where it is mingled with material being transferred from the upstream passage 32 and carried to the exit 51b of the groove at stabilizing passage 41 for recycle. The material passing through the gap H (FIG. 3) between the root of the metering channel 42 and the bottom face 102 of the adjustable member 101 is carried downstream as a controlled flow F toward the blocking member 48. As the material approaches the face 49 of this blocking member 48, it is forced by the face 49 into an exit port 52 where it exits the processor with a flow rate and pressure which are substantially more nearly constant, i.e., more uniform and predictably controlled, than conditions found in the upstream states.

As explained previously in connection with FIG. 3, it is important that the gap H defined by the throttling member 101 in FIG. 6 be adjusted, so that the metered flow F (FIG. 6) be equal to the "averaged" flow over several minutes of time of material incoming through transfer passage 109. Surging portions of the flow of material entering the metering passage 43 in FIG. 6 are being diverted back into the stabilizing passage 41 in FIG. 6. This diversion of material back for recycling in the stabilizing passage ensures that downstream flow F beyond the gap H will be significantly relieved of surge effects. The front face 104 of the adjustable metering member 101 in FIG. 6 is spaced downstream by the angular spacing S from the downstream side of the exit port 51a for reasons as explained in connection with FIG. 3.

It is noted that FIGS. 5 and 6 the stabilizing and metering passages 41, 43 are shown to be located in the downstream end of the overall rotary processor 10A. If the material entering the rotary processor 10A is suitably melted before entering the rotary processor 10A, then in order to provide surge compensation for the incoming material, a stabilizing and metering passage system, as shown in FIGS. 1, 2, 3, 4A, 4B and 4C, can be provided as the initial stages of the rotary processor 10A.

In installations where a sub-atmospheric pressure, i.e., nominally a "vacuum," is being "pulled" (created) in some one or more of the upstream passages 22, 24, 26, 28, 30 and 32 (FIG. 5) for purposes of devolitalization, it is advantageous for the vacuum also to be pulled in the stabilizing (surge-compensating) passage 41, because the recycled material will thereby have a further opportunity to devolatilize or react. In installations where one or more devolatilization or reaction chambers 22, 24, 26, 28, 30 and 32 precede the present surge compensation system, then the arrangement of FIG. 1 is preferred, because the stabilizing passage 41 (channel 42) is thereby on the upstream side adjacent to the preceding passage 32 for convenience in pulling a vacuum in adjacent channels 32 and 42.

Figure 7:
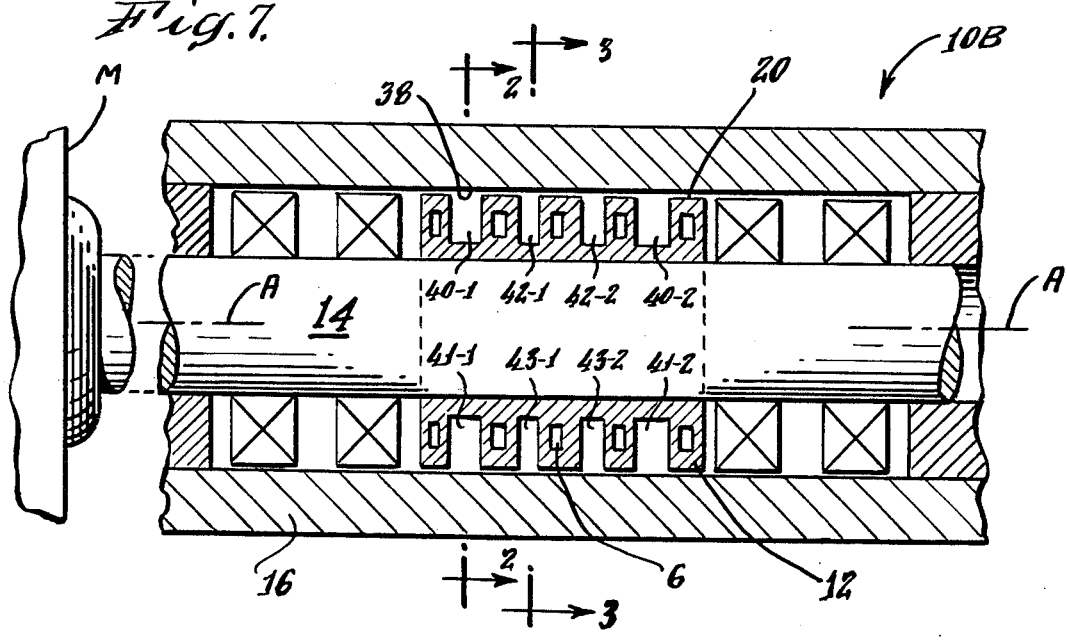
FIG. 7 is an axial sectional view of a rotary metering device incorporating this invention.
Figure 8:
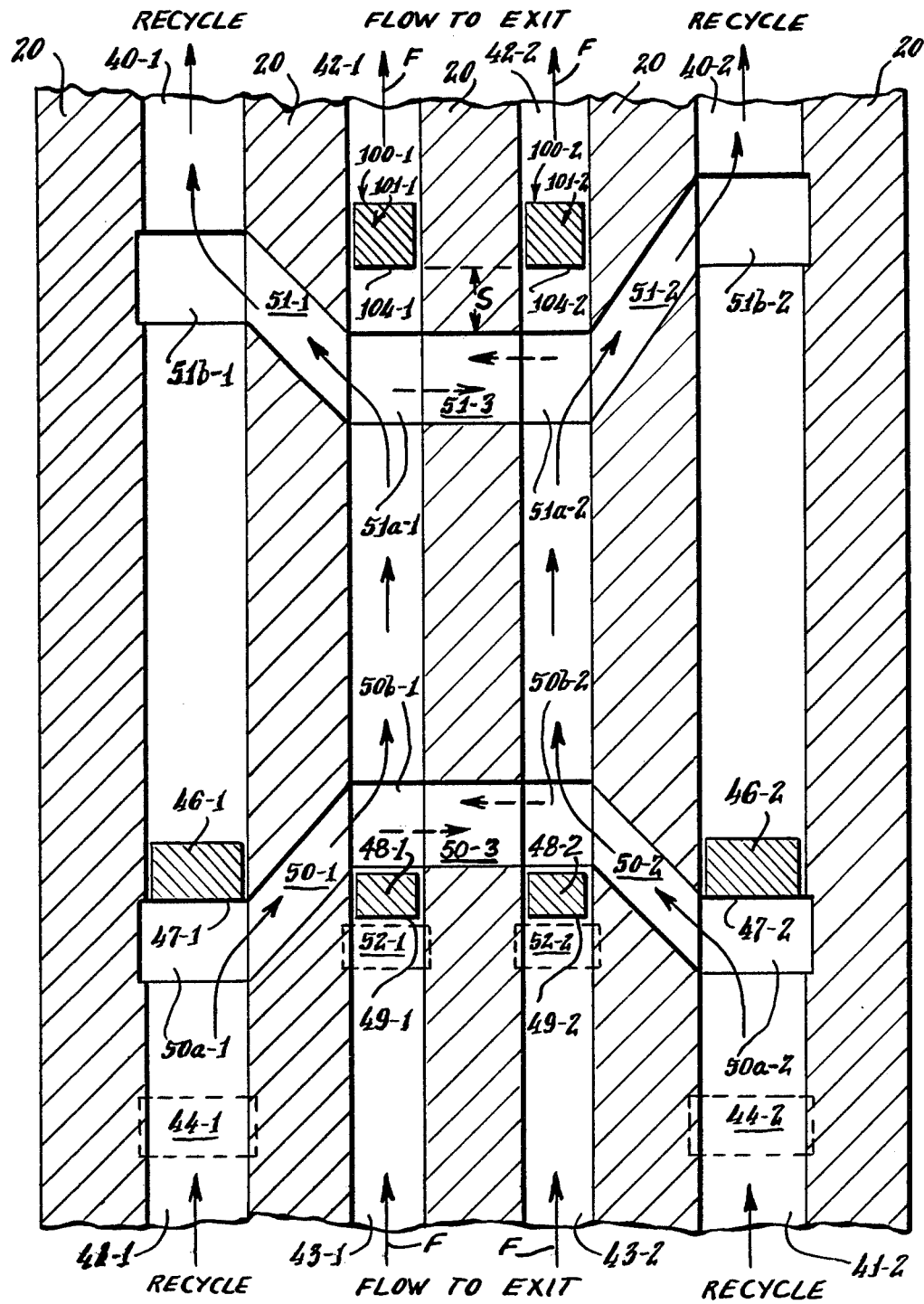
FIG. 8 is an enlarged simplified schematic view of the interconnections of the channels in a metering pumping device by means of transfer grooves with arrows indicating the flow directions of material. A pair of metering channels are shown laid out straight side-by-side in FIG. 8 near the center, and a pair of stabilizing channels straddle these metering channels.

FIGS. 7 and 8 considered in conjunction with FIGS. 2 and 3 represent the embodiment of the present invention in a rotary processor 10B to serve as a metering pumping device for stabilizing the rate of flow and pressure in systems for processing plastic or polymeric materials which are subject to variations in rate of mass flow or pressure. In this embodiment 10B, two equal-sized stabilizing passages 41-1, 41-2 and two equal-sized metering passages 43-1, 43-2 are shown. It will be understood that other combinations of multiple passages may be envisioned for performing this metering function. The two stabilizing passages 41-1 and 41-2 are placed outboard of the metering passages 43-1 and 43-2 in order to flank the higher pressures of the metering passages with the lower pressures of the stabilizing passages, thus simplifying the task of sealing the axial ends of the apparatus 10B for reasons as taught in the aforementioned U.S. Pat. No. 4,411,532.

It will be understood that the elements of the metering device 10B in FIGS. 7 and 8 having reference numbers like those in FIGS. 2 and 3 perform functions similar thereto.

Referring to FIG. 8, in operation molten polymeric or plastic material is fed to the entrance ports 44-1 and 44-2 (see FIG. 2 also) of the stabilizing passages 41-1 and 41-2, the moving walls of the stabilizing channels 40-1 and 40-2 convey the material toward the channel blocking members 46-1 and 46-2. The upstream faces 47 of the blocking members 46-1 and 46-2 divert the flow into perspective transfer grooves 50-1 and 50-2 formed in closure surface 38 which lead the material to the metering passages 43-1 and 43-2. In order to assist in the balance of flow or pressure for equalizing operation on the two sides of the metering device it is desirable (but not necessary) to provide transfer groove 50-3 formed in closure surface 38 connecting the transfer grooves 50-1 and 50-2 to allow flow (dotted arrows) from one passage to the other. It will be understood that the two stabilizing passages 41-1 and 41-2 are operating in parallel flow relationship, and the objective is to have them share equally in the handling of the total throughout of the rotary metering pumping apparatus 10B (FIG. 7). Similarly, the two metering passages 43-1 and 43-2 are operating in parallel flow relationship, and the objective alos is to have them share equally in handling the throughput of this apparatus 10B.

The material entering the metering passages 43-1 and 43-2 (see FIG. 3 also) is conveyed toward the adjustable throttling members 101-1 and 101-2. The upstream faces 104 of these adjustable members divert the excess material which cannot pass through the adjusted gap H between the root of the channel and the bottom face 102 of the respective adjustable throttling member into transfer grooves 51-1 and 51-2 formed in closure surface 38. To assist in balancing the flow or pressure for equalizing operation on each side of the metering device it is desirable (but not necessary) to provide an intermediate transfer groove 51-3 formed in closure surface 38 to allow flow (dotted arrows) from one transfer passage 51-1 to the other 51.2. Transfer grooves 51-1 and 51-2 convey material back to the stabilizing passages 41-1 and 41-2 for recycle.

The controlled flow F of material carried in metering passages 43-1 and 43-2 after passing beneath the bottom faces 102 of the respective adjustable members is conveyed by the moving walls of the channels 42-1 and 42-2 toward the respective channel blocking members 48-1 and 48-2. This flow is diverted by their faces 49 into exist ports 52-1 and 52-2 where the material exits the metering device with a mass flow rate and pressure which are substantially more nearly constant, i.e., more uniform and predictably controlled then conditions of the material supplied to the device.

This metering device 10B may also be incorporated as center stages in a rotary processor having primary and secondary stages at each end of the rotor as described in U.S. Pat. No. 4,213,709.

Inviting attention to FIGS. 9, 10, 11 and 12, all four of these test runs as recorded were carried out on the same rotary processor, having a rotor 12 with a peripheral surface 20 whose diameter is 150 millimeters and being rotated at a constant rate of 150 RPM. In all four test runs the temperature of the housing 16 was maintained at 400° F. and the rotor 12 at 75° F. by circulating heat transfer liquid.

The material being processed in the test runs of FIGS. 9 and 10 was linear low density polyethylene (LLDPE) having a melt index of $MI_2$-1.0 (per ASTM D1238), which is a standard procedure for calculating the melt index of such materials.

Figure 11A:
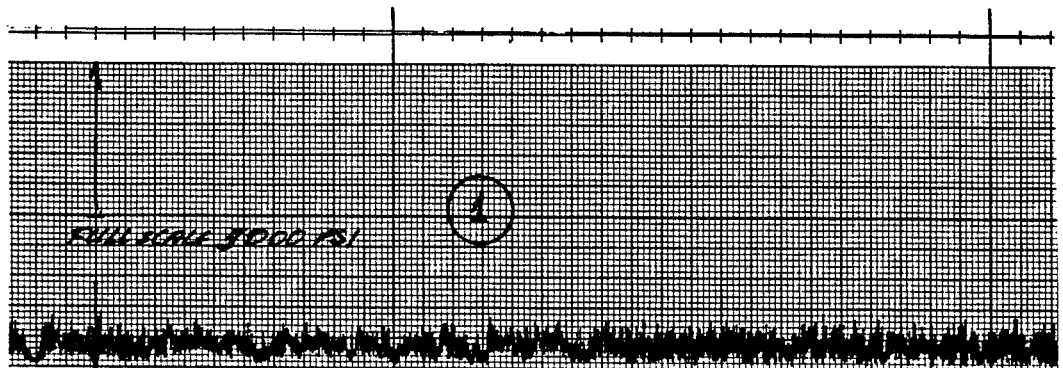
FIGS. 11A, 11B and 11C are graphical plots versus time of the recorded pressure fluctuations at the same three respective locations as in FIGS. 9A, 9B and 9C when processing a different material from that involved in FIGS. 9 and 10 and without the use of the adjustable throttling member.
Figure 11B:
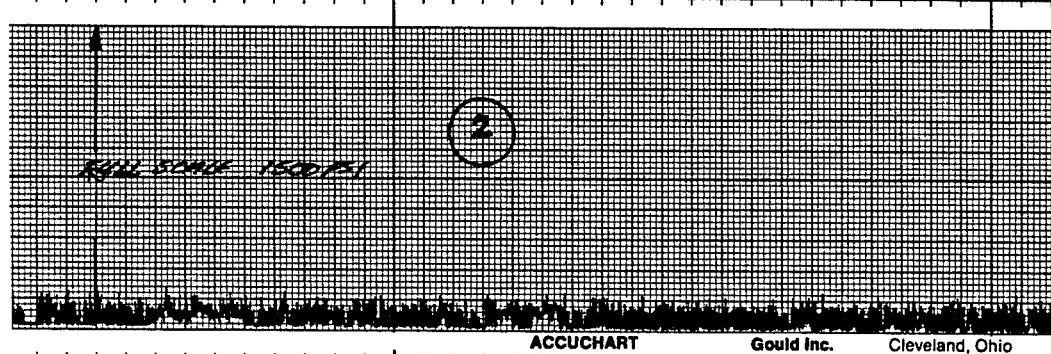
Figure 11C:
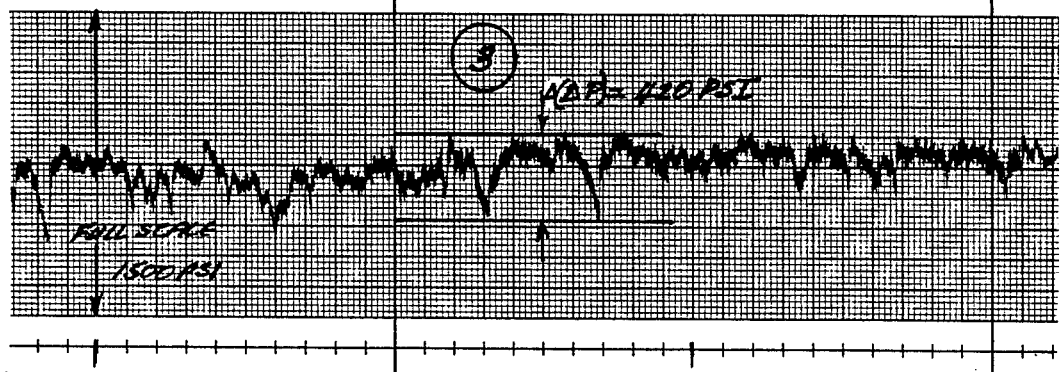
Figure 12A:
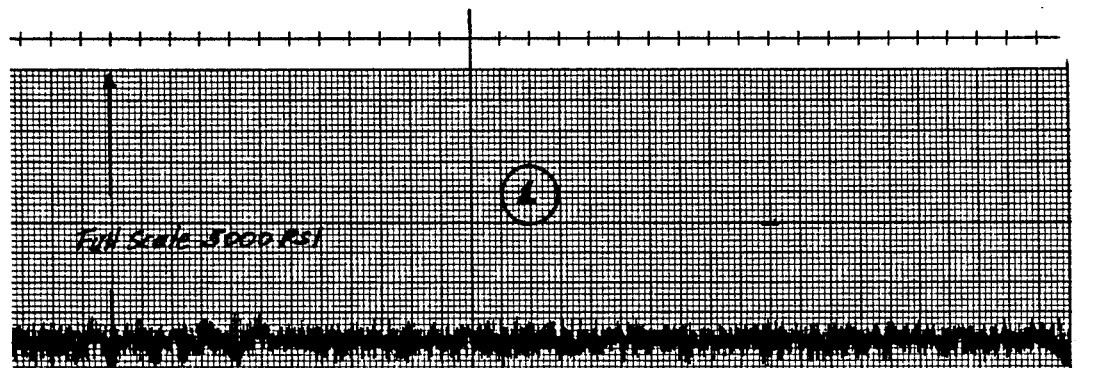
FIGS. 12A, 12B and 12C are graphical plots versus time of the recorded pressure fluctuations occurring in the same three respective locations in the rotary processor and when processing the same material as in FIGS. 11A, 11B and 11C with the adjustable throttling member positioned in the optimum location and thereby reducing the range of fluctuations in output pressure from 420 PSI (FIG. 11C) to 120 PSI (FIG. 12C).
Figure 12B:
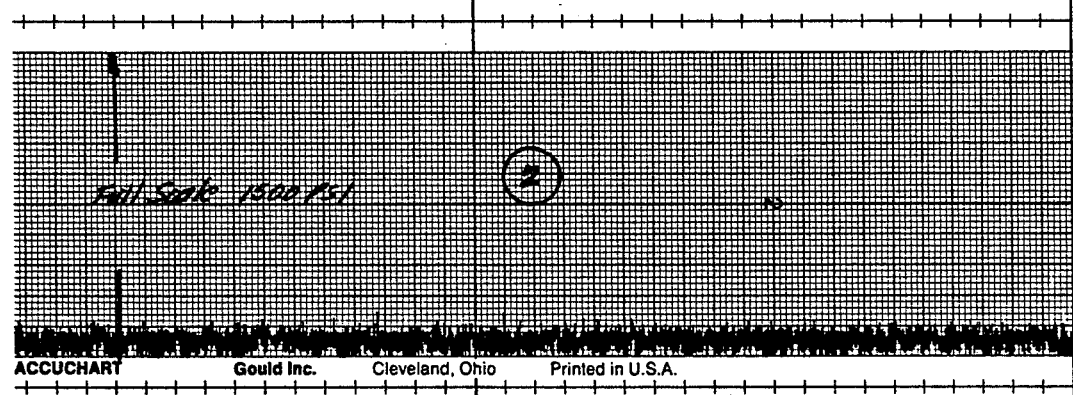
Figure 12C:
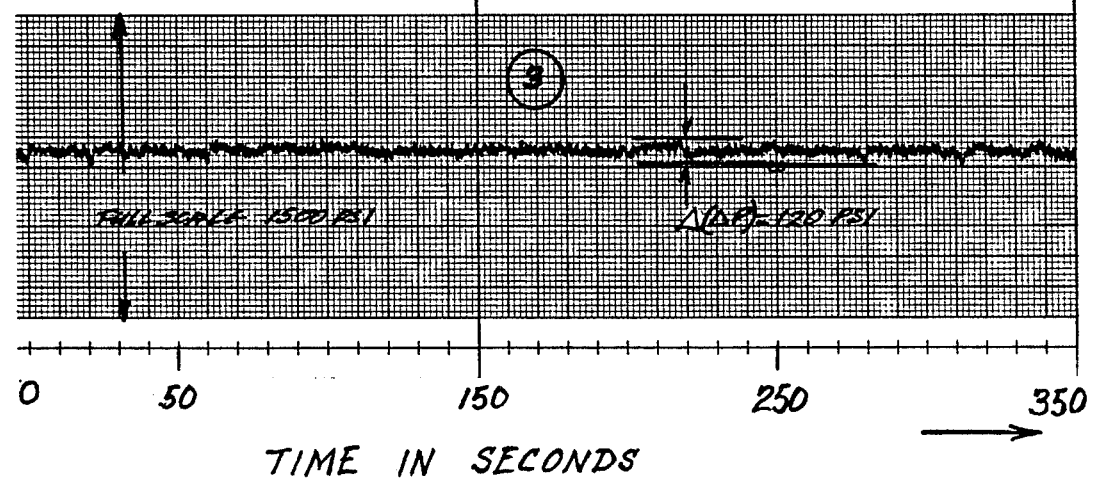

The material being processed in the test runs of FIGS. 11 and 12 was considerably different from that in FIGS. 9 and 10, being low density polyethylene (LDPE) relatively heavily loaded with powdered limestone (calcium carbonate). The mixture was 85% by weight of LDPE and 15% by weight of powdered limestone.

Other recorded data for these four test runs are set forth in the following Table:

TABLE I

| TEST RUN, FIGS. | FLOW RATE LBS/HR | EXIT MELT TEMP °F. | PSI, AV. PRESSURE | | POWER AMPS. |
| --- | --- | --- | --- | --- | --- |
| | | | A | C | |
| 9 | 100 | 430 | 500 | 840 | 35–45 |
| 10 | 100 | 435 | 500 | 840 | 40 |
| 11 | 80 | 445 | 500 | 840 | 35–45 |
| 12 | 80 | 450 | 500 | 840 | 40 |

The average pressure listed in Column "A" above, is for the number 1 plots of FIGS. 9A, 10A, 11A and 12A, and the average pressure listed in Column "C" above is for the number 3 plots of FIGS. 9C, 10C, 11C and 12C.

It is to be noted that the three respective plots numbered 1, 2 and 3 were simultaneously recorded, and thus the horizontal time scale shown at the bottom of the "C" FIG. applies also to the "B" and "A" FIGS. above it. Time was increasing toward the right, as shown by the arrow, and was plotted at two seconds per millimeter of horizontal travel along the chart. Therefore, the time scale is ten seconds per tick mark, which equals a time span of 100 seconds per each ten tick marks, as indicated.

Figure 9A:
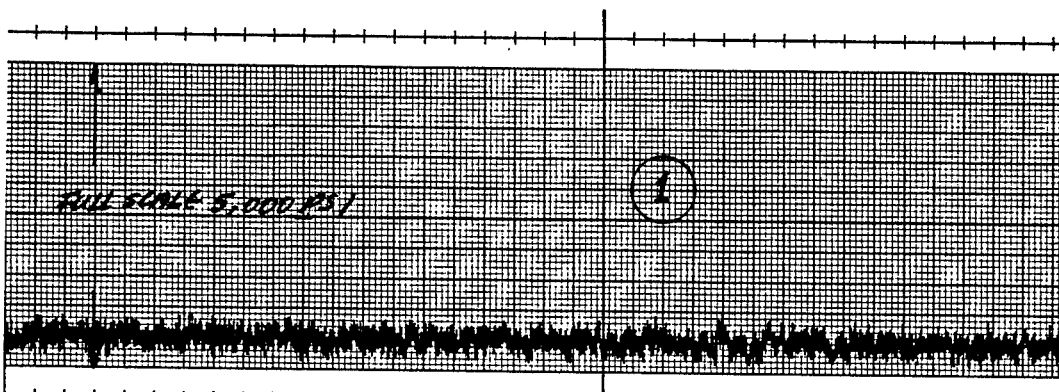
FIGS. 9A, 9B and 9C are graphical plots versus time of the recorded pressure fluctuations in pounds per square inch (PSI) occurring respectively: (1) in the melting stage; (2) at the exit of the melting stage, and (3) at the output of a rotary processor without the use of an adjustable throttling member.

The recorded plot number 1 of FIG. 9A was obtained for the pressure occurring in a melting stage, for example, in the exit from channel 30 in FIG. 5. The full scale for plot 1 in FIG. 9A is 5,000 PSI, and the average recrded pressure was about 500 PSI as shown in Table I above. It is seen that occasionally the pressure was as low as 150 PSI, and occasionally as high as 900 PSI or more.

Figure 9B:
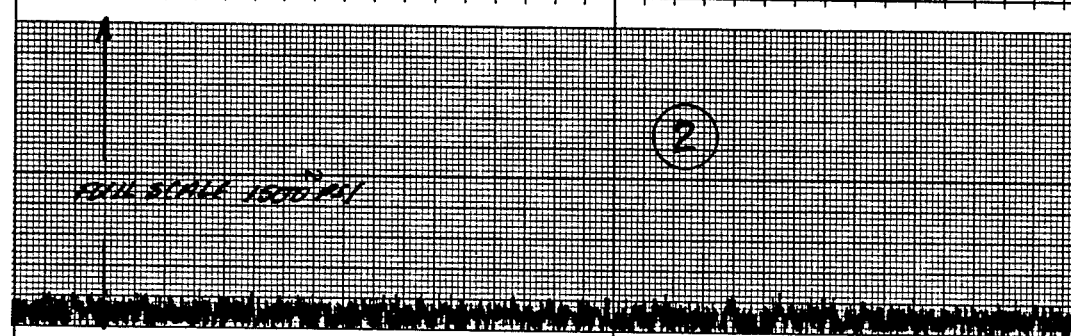

The recorded plot number 2 in FIG. 9B was obtained for the pressure at the exit of the melting stages, for example, in the outet passageway 109 (FIG. 6) from channel 32 (FIG. 5). The full scale for plot 2 in FIG. 9B is 1,500 PSI, and it is seen that this melt stage exit pressure ranged from a low of almost zero PSI to an occasional high of 180 PSI or more.

Figure 9C:
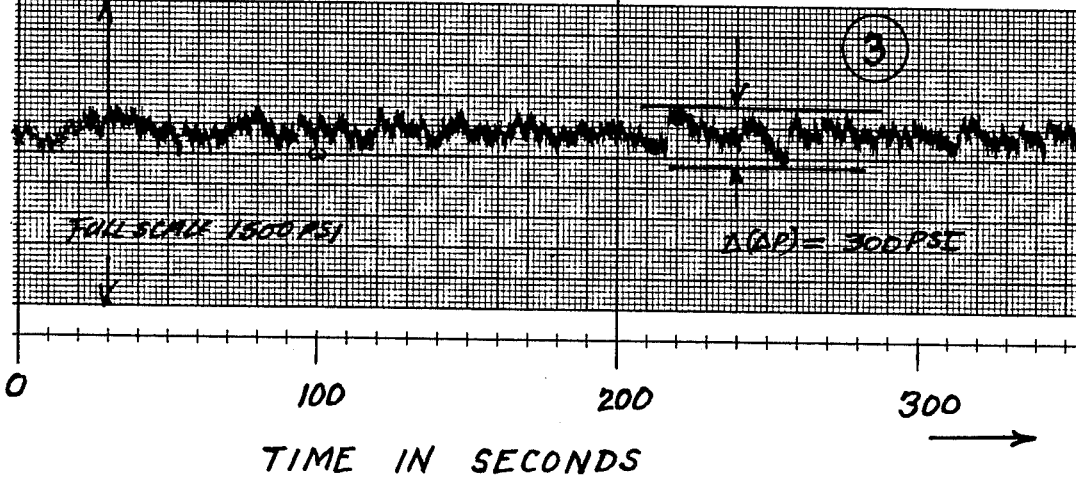

The recorded plot number 3 in FIG. 9C was obtained for the pressure at the outlet 52 (FIG. 3) of the whole rotary processor. The full scale for plot 3 in FIG. 9C is 1,500 PSI, and the average recorded pressure was about 840 PSI, as indicated in Table I. It is seen that the processor exit pressure was occasionally as low as 710 PSI or lower, and occasionally as high as 1,010 PSI, thus amounting to an output pressure fluctuation of about 300 PSI.

This test run of FIG. 9 was conducted without employing the invention. In other words, the metering or throttling member 101 (FIG. 3) was fully withdrawn from the metering channel 42. It is interesting to note from Table I that this 300 PSI fluctuation in output pressure was reflected in the elctrical power being supplied to the constant speed motor drive, wherein the Amperage was varying between 35 and 45 Amperes.

Figure 10A:
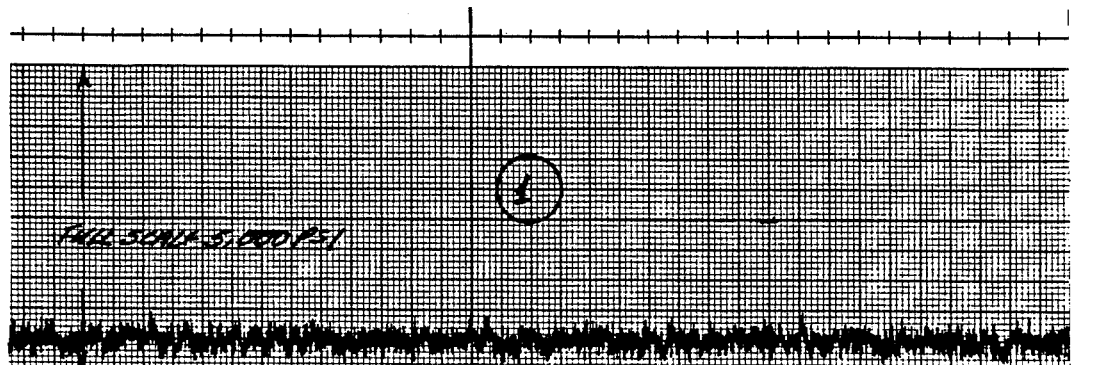
FIGS. 10A, 10B and 10C are graphical plots versus time of the recorded pressure fluctuations occurring in the same three respective locations in the rotary processor and when processing the same material as in FIGS. 9A, 9B and 9C with the adjustable throttling member positioned in the optimum location and thereby reducing the range of fluctuation in output pressure from 300 PSI (FIG. 9C) to 120 PSI (FIG. 10C).
Figure 10B:
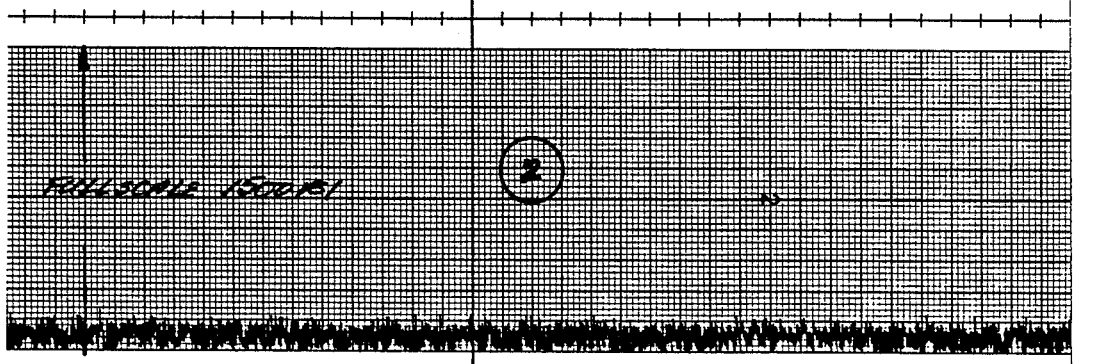
Figure 10C:
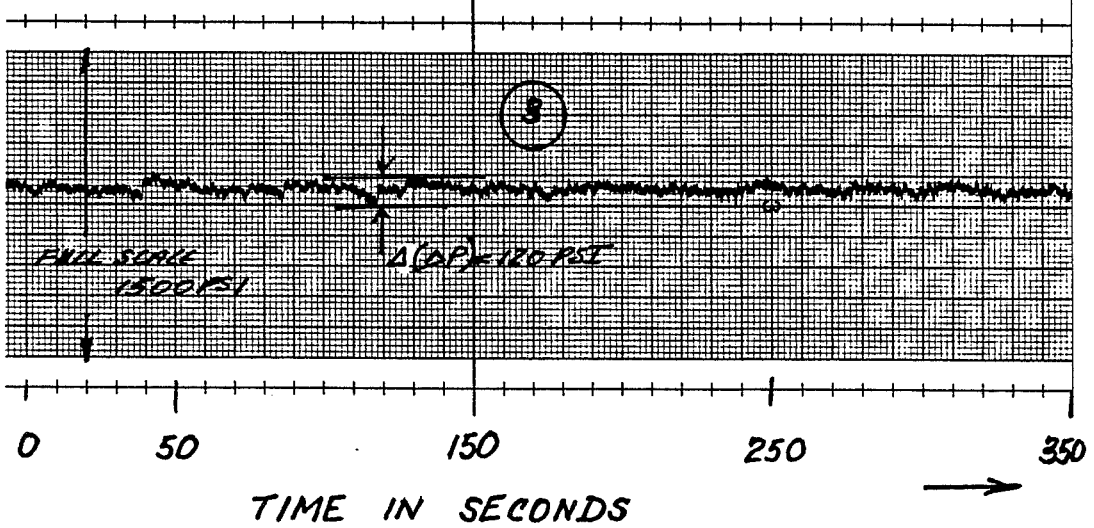

The plots 1, 2 and 3 in FIGS. 10A, 10B and 10C, respectively, are for pressures being sensed at the same respective locations as described for FIGS. 9A, 9B and 9C in the rotary processor employing the invention. The metering or throttling member 101 (FIG. 3) was adjusted to the optimum setting for gap H. The plots 1 and 2 of FIGS. 10A and 10B are very similar to the plots 1 and 2 of FIGS. 9A and 9B, respectively, in average pressure values and in ranges of pressure variations.

The plot 3 of FIG. 10C shows that by employing the invention the pressure fluctuations at the exit 52 from the processor were kept within a range of about 120 PSI. The minimum pressure was occasionally down to about 770 PSI and up to about 890 PSI. The reduction in range of pressure fluctuations from 300 PSI to 120 PSI is a dramatic improvement. It is also interesting to note from Table I that the Amerage for the motor drive held steady at about 40 Amperes when the invention was employed.

Due to the extra working of the material caused by recycling 19 (FIG. 3) and caused by the flow F being driven through the gap H, the exit melt temperature at the exit port 52 was 5° F. higher, being at 435° F. as compared with 430° F. for the exit melt temperature for the test run of FIG. 9.

The plots 1, 2 and 3 in FIGS. 11A, 11B and 11C, respectively, are for pressures being sensed at the same respective locations as in FIGS. 9 and 10. The material being processed in FIGS. 11 was LDPE loaded with 15% powdered limestone as explained previously.

The plots 1 and 2 of FIGS. 11A and 11B are similar to the plots 1 and 2, respectively, of FIGS. 9A and 9B and of FIGS. 10A and 10B.

The average recorded pressure of plot 3 in FIG. 11C is about 840 PSI. It is seen that the processor exit pressure was occasionally below 450 PSI and occasionally above 900 PSI when looking at the entire plotted time span of about 350 seconds. Over a shorter time span, as shown by the vertical separation of the spaced parallel horizontal lines, the range of pressure fluctuations was about 420 PSI. The Amperage of the drive fluctuated from 35 to 45 Amperes.

When the invention was employed, as shown in FIG. 12C, once again a dramatic improvement was obtained compared with FIG. 11C. The range of fluctuations in processor exit pressure was reduced to 120 PSI and the drive motor Amperage held steady at 40 Amperes.

The material being processed in FIGS. 11 and 12 was considerably different from the material being processed in FIGS. 9 and 10, and yet a dramatic improvement was obtained in both cases by employing the invention.

Due to the extra work involved in processing the LDPE loaded with powdered limestone, the exit melt temperature was 445° F. as set forth in Table I for the test run of FIGS. 11. Then, when the invention was employed, the melt exit temperature was 5° F. higher, being at about 450° F. as set forth in Table I, due to the additional work involved in the recycling of material 19 (FIG. 3) and in driving the flow F of material through the gap H.

In summary, these test runs demonstrate dramatically the surge compensation advantages provided by employing the present invention in rotary processors. Moreover, it is seen that these advantages are obtained regardless of the particular materials being processed.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a rotary processor having a rotor carrying a plurality of channels each encircling an axis and stationary means providing a coaxial closure cooperatively arranged with the channels for providing a plurality of enclosed processing passages, a system for reducing fluctuations in the mass flow and pressure of plastic and polymeric materials comprising:

said rotor channels and closure surface defining at least one stabilizing passage and at least one metering passage;

means defining a feed path leading into said stabilizing passage for feeding into said stabilizing passage a flow of such material subject to such fluctuations;

means defining a first material transfer passage leading from said stabilizing passage to an entrance into said metering passage;

means defining a second material transfer passage leading from an exit from said metering passage back into said stabilizing passage;

said first material transfer passage communicating with said stabilizing passage at a location downstream from the location where said feed path communicates with said stabilizing passage;

channel blocking means in said stabilizing passage downstream from said first material transfer passage and being operatively associated with said first material transfer passage for causing the material carried by said stabilizing passage to be transferred from said stabilizing passage through said first material transfer passage into said metering passage;

said exit being located downstream from said entrance;

said second material transfer passage communicating with said stabilizing passage at a location downstream from said channel blocking means;

an adjustable throttling element in said metering channel downstream from said exit for partially blocking said metering passage for allowing a metered flow of material to be carried past said throttling element for providing a metered flow of material in said metering passage downstream from said throttling element;

said throttling element being associated with said exit for causing excess material in said metering passage exceeding said metered flow to be transferred back through said second material transfer passage into said stabilizing passage for recycling;

means defining a discharge outlet from said metering passage downstream from said throttling element; and second channel blocking means in said metering passage operatively associated with said discharge outlet for causing said metered flow to leave said metering passage through said discharge outlet wherein the fluctuations in mass flow and pressure are substantially reduced or practically eliminated.

2. In a rotary processor, a system for reducing fluctuations in the mass flow and pressure of plastic and polymeric materials as claimed in claim 1 wherein:

said first and second material transfer passages are grooves formed in the closure surface arranged and adapted to transfer material between said stabilizing and metering passages.

3. In a rotary processor, a system for reducing fluctuations in mass flow and pressure of plastic and polymeric material as claimed in claim 1, therein:

said throttling element is adjustable in depth into the channel in said rotor defining said metering passage.

4. In a rotary precessor, a system for reduciing fluctuations in mass flow and pressure of plastic and polymeric material as claimed in claim 3, in which:

said throttling element comprises:

(a) a throttling pin which is extendable radially into said metering passage and is of dimensions for providing at least nearly complete blocking of the metering passage when fully extended into said metering passage;

(b) positioning means associated with said stationary element, said positioning means allowing substantially complete withdrawal of said throttling pin from said metering passage and being shaped complimentarily to said throttling pin for resisting deflection of said throttling pin in the direction of rotation of said rotor while permitting radial adjustment of said throttling pin; and (c) adjusting means coupled to said throttling pin for moving said throttling pin radially into and out of said metering passage for adjusting the rate of mass flow of said material in said metering passage downstream from said throttling means.

5. In a rotary processor, a system for reducing fluctuations in mass flow and pressure of plastic and polymeric materials as claimed in claim 2, in which:

said rotary processor includes at least one upstream channel;

said metering passage is positioned between said upstream channel and said stabilizing passage;

said second material transfer passage has an inlet communicating with said upstream channel;

said second material transfer passage extends past said metering passage to said stabilizing passage; and said first exit from said metering passage communicates with an intermediate portion of said second material transfer passage.

6. In a rotary processor, a system for reducing fluctuations in mass flow and pressure of plastic and polymeric materials as claimed in claim 1, in which:

said stabilizing passage and said metering passage each have uniform cross sectional areas along their respective channels; and said stabilizing passage has a larger volume and a larger cross sectional area than said metering passage.

7. In a rotary processor, a system for reducing fluctuations in mass flow and pressure of plastic and polymeric materials as claimed in claim 3, in which:

said first exit and said throttling element are positioned with respect to said metering passage less than forty percent of the total distance downstream along said metering passage from said entrance to said discharge outlet.

8. In a rotary processor, a system for reducing fluctuations in mass flow and pressure of plastic and polymeric materials as claimed in claim 1, in which:

said rotary processor includes a first pair of equal-sized channels defining with said closure surface first and second stabilizing passages;

said rotary processor also includes a second pair of equal-sized channels defining with said closure surface first and second metering passages;

said first material transfer passage leads from said first stabilizing passage to said entrance into said first metering passage;

said second material transfer passage leads from said exit from said metering passage back to said first stabilizing passage;

said rotary processor includes third and fourth material transfer passages;

said third material transfer passage leads from said second stabilizing passage to an entrance into said second metering passage;

said fourth material transfer passage leads from an exit from said second metering passage back into said stabilizing passage;

third channel blocking means in said second stabilizing passage downstream from said third material transfer passage for causing the material carried by said second stabilizing passage to be transferred from said stabilizing passage through said third material transfer passage into said second metering passage;

a second adjustable throttling element in said second metering channel downstream from said exit from said second metering channel for partially blocking said second metering passage for allowing a metered flow of material to be carried past said throttling element for providing a metered flow of material in said metering passage downstream from said throttling element;

said second throttling element being associated with said exit from said second metering passage for causing excess material in said second metering passage exceeding said metered flow to be transferred back through said fourth material transfer passage into said second stabilizing passage for recycling;

means defining a discharge outlet from said second metering passage downstream from said throttling element; and fourth channel blocking means in said second metering passage operatively associated with said discharge outlet for causing said metered flow to leave said second metering passage through said discharge outlet wherein the fluctuations in mass flow and pressure are substantially reduced.

9. In a rotary processor, a system for reducing fluctuations in mass flow and pressure of plastic and polymeric materials as claimed in claim 8, in which:

said first material transfer passage and said third material transfer passage are in communication with each other for equalizing the operation of said first and second stabilizing passages; and said second material transfer passage and said fourth material transfer passage are in communication with each other for equalizing the operation of said first and second metering passages.

10. In a rotary processor, a system for reducing fluctuations in mass flow and pressure of plastic and polymeric materials as claimed in claim 9, in which:

said first and second metering passages are positioned as a pair relatively near each other;

said first and second stabilizing passages are positioned as a pair located on opposite sides of said pair of metering passages in straddling relationship therewith; and said rotary processor includes a fifth material transfer passage interconnecting said first and third material transfer passages near the locations of the respective entrances of said first and third material transfer passages into the respective first and second metering passages.

11. In a rotary processor, a system for reducing fluctuations in mass flow and pressure of plastic and polymeric materials as claimed in claim 8, in which:

said first and second metering passages are positioned as a pair relatively near each other;

said first and second stabilizing passages are positioned as a pair located on opposite sides of said pair of metering passages in straddling relationship therewith; and said rotary processor includes a fifth material transfer passage interconnecting said second and fourth material transfer passages near the locations of the respective exits from said first and second metering passages into the respective second and fourth material transfer passages.

12. In a rotary processor having a rotor carrying a plurality of channels and stationary means providing a coaxial closure surface cooperatively arranged with the channels to provide a plurality of enclosed processing passages, and having a feed path leading into a first of said processing passages and having a discharge outlet from a second of said passages, the method for reducing fluctuations in the mass flow and pressure of plastic or polymeric material entering through said feed path into said first processing passage comprising performing the steps of:

diverting from said first processing passage into an entrance into said second processing passage substantially all of the material fed into said first processing passage through said feed path;

downstream from said entrance dividing the material in said second processing passage into a controlled first flow and a recycled second flow;

diverting said recycled second flow back into said first processing passage at a location downstream from the position where substantially all of the material was diverted therefrom for recycling said second flow;

allowing said controlled first flow to continue downstream in said second processing passage from the position where said dividing of the flows was performed; and discharging through an outlet from said second processing passage the controlled flow which was allowed to continue downstream in said second processing passage for providing a discharged controlled flow of material more uniform in mass flow and pressure that the material entering through said feed path.

13. In a rotary processor, the method as claimed in claim 12, wherein:

said first processing passage is provided with a larger cross sectional area and a larger volume than said second processing passage; and said dividing of the material in said second processing passage into said controlled first flow and said recycled second flow is performed by diverting from said second processing passage substantially all of the material in said second processing passage located above a predetermined height H from the bottom of the channel defining with said closure surface said second processing passage for forming said recycled second flow, and allowing the material nearer the bottom of said channel than said predetermined height H to continue downstream in said channel toward said outlet for forming said controlled first flow.

14. In a rotary processor having a rotor carrying a plurality of channels each encircling an axis and stationary means providing a coaxial closure cooperatively arranged with the channels for providing a plurality of enclosed processing passages and having a feed path leading into a first of said processing passages for feeding plastic material into said first processing passage and having a discharge outlet from a second of said processing passages; apparatus for providing controlled flow having markedly reduced fluctuations in mass flow and pressure as compared with the material entering through said feed path into said first processing passage comprising:

means defining a first transfer passage from said first processing passage to an entrance into said second processing passage;

first channel blocking means in said first processing passage downstream from said first transfer passage for causing substantially all of the material carried in said first processing passage toward said first channel blocking means to be diverted from said first processing passage through said first transfer passage into said second processing passage;

means defining an exit from said second processing passage and a second transfer passage leading from said exit back into said first processing passage at a location downstream from said first channel blocking means;

said exit being positioned downstream from said entrance;

adjustable metering means associated with said second processing passage and being positioned closely downstream from said exit for separating the material carried by said second processing passage toward said metering means into a controlled first flow and a recycled second flow;

said recycled second flow being diverted from said second processing passage through said second transfer passage back into said first processing passage, and said controlled first flow being carried by said second processing passage downstream from said metering means;

means defining a discharge outlet from said second processing passage downstream from said metering means; and second channel blocking means in said second processing passage downstream from said discharge outlet for diverting through said discharge outlet substantially all of said controlled first flow carried by said second processing channel thus providing a controlled flow of material through said discharge outlet having markedly reduced fluctuations in mass flow and pressure as compared with the material entering through said feed path.

15. In a rotary processor, the apparatus as claimed in claim 14, in which:

said adjustable metering means includes a movable metering element having a lower surface movable into said second processing passage to a desired distance H from a bottom of said second processing passage;

said metering element diverts into said recycled second flow in said second transfer passage substantially all of the portion of material in said second processing passage located at a greater distance than said distance H from said bottom of said second processing passage; and said metering element allows into said controlled first flow the portion of the material in said second passage passing between the lower surface of said metering element and the bottom of said second passage.

16. In a rotary processor, apparatus as claimed in claim 15, in which:

said first and second processing passages have uniform cross sectional areas therealong; and said first processing passage has a larger cross sectional area and a larger volume than said second processing passage.

17. In a rotary processor, a system for reducing fluctuations in mass flow and pressure of processed material as claimed in claim 1, in which:

said feed path leading into said stabilizing passage includes at least one rotor channel preceding said stabilizing passage and sub-atmospheric pressure is pulled in said rotor channel for devolatilization of the material therein, and sub-atmospheric pressure is also pulled in said stabilizing passage for further devolatilization of the recycled material in said stabilizing passage.

18. In a rotary processor, a system for reducing fluctuations in mass flow and pressure of processed material as claimed in claim 1, in which:

said exit from said metering passage is spaced upstream from said adjustable throttling element by an angular spacing about the rotor in the range from about 5° to about 20°.

19. In a rotary processor, a system for reducing fluctuations in mass flow and pressure of processed material as claimed in claim 1, in which:

said throttling element is adjustable for allowing the metered flow of material carried past said throttling element to be equal to the "averaged" flow over several minutes of material feeding into said stabilizing passage through said feed path.

20. In a rotary processor, the method as claimed in claim 12, wherein:

the material in said second processing passage is divided into said controlled first flow equal to the "averaged" flow over several minutes of material entering through said feed path into said first processing passage.

21. In a rotary processor, the method as claimed in claim 13, wherein:

said dividing of the material in said second processing passage into said controlled first flow and said recycled second flow is angularly spaced downstream from said diverting of said recycled second flow by an angular spacing about the rotor in the range from about 5° to about 20° for generating pressure for driving material nearer the bottom of said channel than said predetermined height H to continue downstream in said channel.

22. In a rotary processor, the method as claimed in claim 12, wherein:
    said feed path leading into said first processing passage includes at least one clannel in said rotor preceding said first processing passage and sub-atmospheric pressure is pulled in said channel for devolatilization of the material therein, and
    pulling sub-atmospheric pressure in said first processing passage for further devolatilization of said recycled second flow of material therein.

23. In a rotary processor, apparatus as claimed in claim 14, in which:
    said feed path leading into said first processing passage includes at least one channel in said rotor preceding said first processing passage and sub-atmospheric pressure is pulled in said channel for devolatilization of the material therein, and
    sub-atmospheric pressure is also pulled in said first processing passage for further devolatilization of said recycled second flow of material therein.

24. In a rotary processor, apparatus as claimed in claim 15, in which:
    said movable metering element is spaced downstream from said exit from said second processing passage by an angular spacing of at least about 5° relative to the shaft of the rotor for generating pressure in the material carried by said second processing passage for driving the material downstream between the lower surface of said metering element and the bottom of said second processing passage.

25. In a rotary processor, apparatus as claimed in claim 15, in which:
    said metering element is adjustable into a distance H from the bottom of said second processing passage for causing said controlled first flow of the material to be equal to the "averaged" flow over several minutes of the material fed into said first processing passage via said feed path.

26. In a rotary processor for plastic, polymeric and similar materials and having a rotor carrying a plurality of channels each encircling an axis and stationary means encircling the rotor and providing a coaxial enclosure cooperatively arranged with the rotor channels for providing a plurality of enclosed processing passages, a surge compensation system for compensating for surges arising upstream in the material being processed, said surge compensation system comprising:
    said rotor channels including at last one stabilizing channel and at least one metering channel,
    said stabilizing channel being wider in the axial direction than said metering channel,
    means defining a feed path leading into said stabilizing channel for feeding into said stabilizing channel a flow of such material subject to such surges;
    means defining a first material transfer passage leading from said stabilizing channel to an entrance into said metering channel;
    means defining a second material transfer passage leading from an exit from said metering channel back into said stabilizing channel;
    said first material transfer passage communicating with said stabilizing channel at a location downstream from the location where said feed path communicates with said stabilizing channel;
    first channel blocking means in said stabilizing channel downstream from said first material transfer passage and being operatively associated with said first material transfer passage for causing the material carried by said stabilizing channel to be transferred from said stabilizing channel through said first material transfer passage into said metering channel;
    said exit from said metering channel being located downstream from said entrance into said metering channel;
    said second material transfer passage communicating with said stabilizing channel at a location downstream from said channel blocking means;
    an adjustable throttling element extending into said metering channel and positioned downstream from said exit for partially blocking said metering channel for allowing a metered flow of material to be carried past said throttling element for providing a metered flow of material in said metering channel downstream from said throttling element;
    said throttling element being positioned downstream from said exit by an angular spacing of at least 5° about said axis;
    said throttling element being adjustable into said metering channel to a depth for causing said metered flow to be equal to the "averaged" flow over at least three minutes of the material passing through said feed path into said stabilizing passage;
    said throttling element being associated with said exit for causing excess material in said metering channel exceeding said metered flow to be transferred back through said second material transfer passage into said stabilizing channel for recycling;
    means defining a discharge outlet from said metering channel downstream from said throttling element; and
    second channel blocking means in said metering channel operatively associated with said discharge outlet for causing said metered flow to leave said metering channel through said discharge outlet wherin the surges in the material are markedly reduced.

* * * * *